(12) United States Patent
Kang et al.

(10) Patent No.: US 8,217,779 B2
(45) Date of Patent: Jul. 10, 2012

(54) RADIO FREQUENCY IDENTIFICATION DEVICE

(75) Inventors: Hee Bok Kang, Chungcheongbuk-do (KR); Suk Kyoung Hong, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1048 days.

(21) Appl. No.: 12/147,710

(22) Filed: Jun. 27, 2008

(65) Prior Publication Data

US 2009/0261953 A1  Oct. 22, 2009

(30) Foreign Application Priority Data

Apr. 18, 2008  (KR) .................. 10-2008-0036122

(51) Int. Cl.
*G08B 23/00* (2006.01)

(52) U.S. Cl. ............. 340/501; 340/870.17; 340/449; 340/10.4; 340/10.1; 73/204.19

(58) Field of Classification Search .......... 340/442–449, 340/870.17, 501, 505, 588–589, 10.1, 10.4; 73/204.18, 204.19
See application file for complete search history.

(56) References Cited

U.S. PATENT DOCUMENTS

| | | | | |
|---|---|---|---|---|
| 5,767,792 A | * | 6/1998 | Urbas et al. | 340/870.17 |
| 6,369,712 B2 | * | 4/2002 | Letkomiller et al. | 340/572.1 |
| 6,545,599 B2 | * | 4/2003 | Derbyshire et al. | 340/442 |
| 7,015,826 B1 | * | 3/2006 | Chan et al. | 340/870.17 |
| 2007/0126471 A1 | * | 6/2007 | Jeong | 326/30 |
| 2007/0171693 A1 | * | 7/2007 | Koyama | 365/145 |
| 2007/0205916 A1 | * | 9/2007 | Blom et al. | 340/870.17 |
| 2008/0079542 A1 | | 4/2008 | Rofougaran | |

FOREIGN PATENT DOCUMENTS

| | | |
|---|---|---|
| KR | 20070036648 A | 4/2007 |
| KR | 100764438 B1 | 9/2007 |
| KR | 10-0821518 B1 | 4/2008 |
| KR | 20080034016 A | 4/2008 |
| KR | 1020080033588 A | 4/2008 |

* cited by examiner

*Primary Examiner* — Daniel Wu
*Assistant Examiner* — Nay Tun
(74) *Attorney, Agent, or Firm* — Ladas & Parry LLP

(57) ABSTRACT

An RFID device includes an analog block, a digital block, and a memory block. The analog block receives a radio frequency signal in order to output an operating command signal. The digital block outputs an address, an operating control signal, a temperature sensor activating signal, and a temperature compensating signal in response to the operating command signal. The memory block reads/writes data in a cell array having a plurality of nonvolatile ferroelectric capacitors. The memory block also has a temperature treating unit that sets a parameter value for temperature compensation in response to the temperature compensating signal, detects a temperature change state in an RFID tag in response to the temperature sensor activating signal, and compares the temperature change state with the parameter value. The parameter value is changed according to the comparison result and outputs a digital code value corresponding to the temperature change state.

23 Claims, 15 Drawing Sheets

RADIO FREQUENCY IDENTIFICATION DEVICE

CROSS-REFERENCE TO RELATED APPLICATION

This application is based upon and claims the benefit of priority to Korean Patent Application No. 10-2008-0036122, filed on Apr. 18, 2008, the entire contents of which are incorporated herein by reference.

BACKGROUND OF THE INVENTION

The present invention generally relates to a Radio Frequency Identification (RFID) device, and more particularly, to an RFID device which detects and compensates for a temperature measured at a check point so that temperature change in temperature sensitive materials can be traced.

The data processing speed of nonvolatile ferroelectric memory, that is, Ferroelectric Random Access Memory (FeRAM), is typically similar to that of Dynamic Random Access Memory (DRAM). However, FeRAM is different than DRAM, in that data stored in FeRAM is conserved even when the power supply of the memory device is turned off. Thus, FeRAM is quickly gaining publicity and is considered a strong candidate as a next generation memory device.

The structure of FeRAM is similar to that of DRAM in that FeRAM includes a plurality of capacitors. However, the capacitors in a FeRAM device are made of a ferroelectric material having a high residual polarization, which in turn allows for data retention even when the power supplied to the memory device is terminated.

An RFID device stores data within a memory. A typical RFID device includes an analog block, a digital block, and a memory block. The RFID device is operated by a power source which supplies power to the device via transmission received by an antenna of the RFID device. As the distance between the power source and the antenna increases, the power received by the RFID device decreases. As a consequence, it is essential that each circuit of the RFID device have relatively low power consumption.

In RFID tags, temperatures are recorded at check points, and temperature changes are traced during a material moving process in which temperature sensitive materials are being treated. Conventional RFID tags do not include any type of temperature detection within the device, and therefore a separate thermometer is required.

Conventional RFID tags are manufactured using a variety of different processes. As such, even when RFID chips are under the same types of temperature conditions, the RFID chips may have different circuit configurations and different process conditions, so as to have different output voltages. The values used to measure temperature can therefore vary according to the RFID chip characteristics, and thus an RFID chip which can compensate for a temperature measuring value that varies according to the characteristics of the chip is necessary.

SUMMARY OF THE INVENTION

Embodiments of the present invention include an RFID device which detects the temperature from an RFID tag chip, outputs a voltage corresponding to the detected temperature, converts the voltage into a digital signal, and outputs the digital signal to a data bus without the requirement of an additional temperature sensor, thereby reducing the layout area of a RFID device.

Embodiments of the present invention include an RFID device that stores temperature data detected from an RFID tag chip in temperature memory located at a specific region of the cell region of the RFID device to facilitate the subsequent usage of the temperature information.

Embodiments of the present invention include an RFID device which measures the temperature characteristic in a RFID tag chip to compensate for the temperature characteristic and stores the information in a nonvolatile register, thereby stabilizing the output voltage by compensating for the temperature change.

According to an embodiment of the present invention, an RFID device comprises: an analog block configured to receive a radio frequency signal and to detect an operating command signal from the radio frequency signal in order to output the operating command signal; a digital block configured to receive and analyze the operating command signal and to output an operating control signal, a temperature sensor activating signal, and a temperature compensating signal; a memory block configured to receive the operating control signal, the temperature sensor activating signal, and the temperature compensating signal, the memory block comprising; a temperature treating unit configured to set a parameter value for temperature compensation in response to the temperature compensating signal, configured to detect a temperature change state in response to the temperature sensor activating signal, and comparing the temperature change state to the parameter value, wherein the temperature treating unit changes the parameter value according to the result of the comparison and outputs a digital code value corresponding to the temperature change state.

According to another embodiment of the present invention, a RFID device comprises: a memory block configured to read/write data in a cell array including a plurality of nonvolatile ferroelectric capacitors; and a temperature treating unit configured to set a parameter value for temperature compensation in response to a temperature compensating signal, configured to detect a temperature change state in response to a temperature sensor activating signal and comparing the temperature change state to the parameter value, wherein the temperature treating unit changes the parameter value according to the result of the comparison and outputs a digital code value corresponding to the temperature change state.

DESCRIPTION OF SPECIFIC EMBODIMENTS

Figure 1:
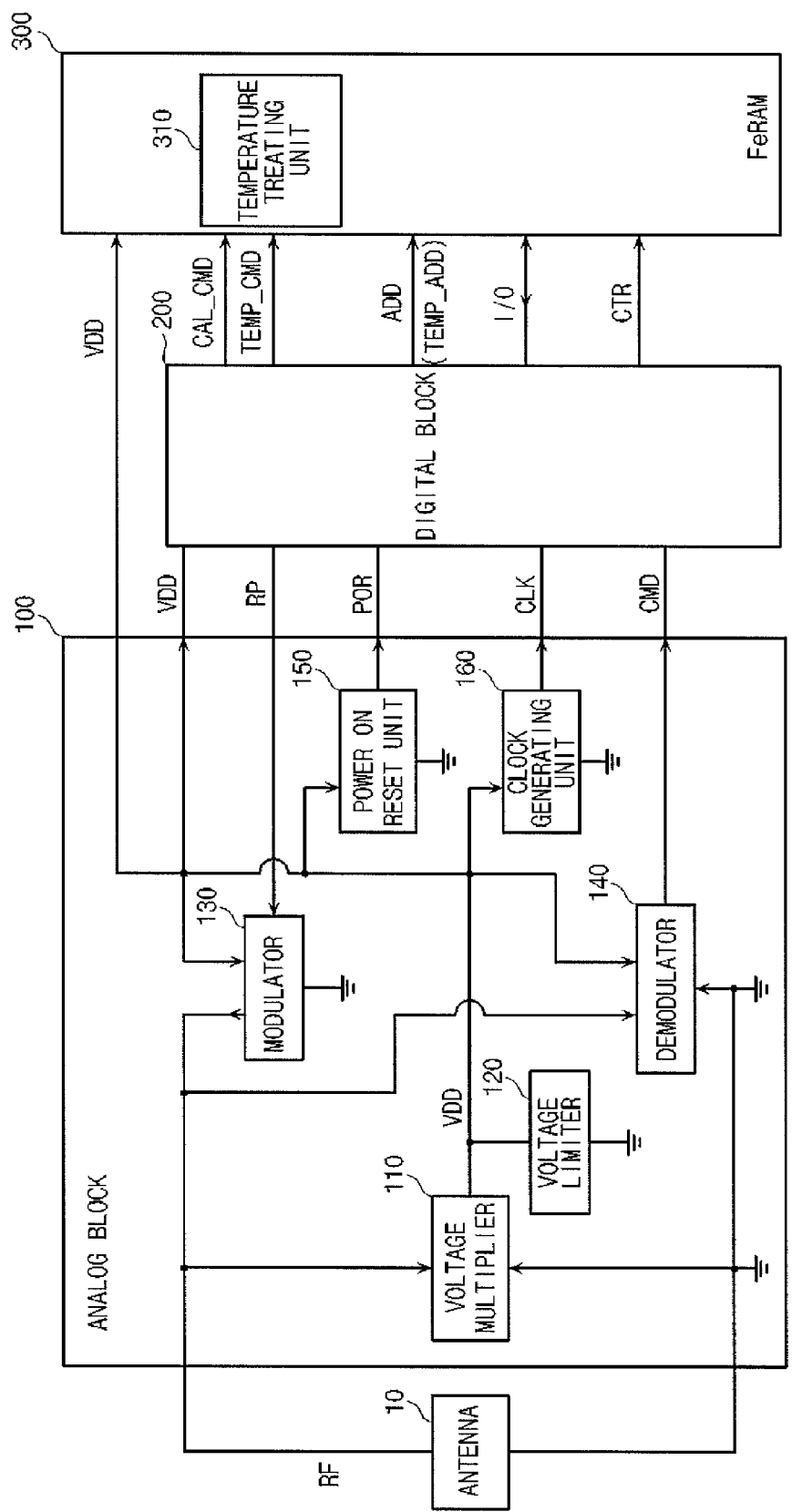
FIG. 1 is a diagram showing an RFID device according to an embodiment of the present invention.

FIG. 1 is a diagram showing an RFID device according to an embodiment of the present invention.

Referring to FIG. 1, the RFID device comprises an analog block 100, a digital block 200, and a nonvolatile FeRAM 300.

The analog block 100 includes a voltage multiplier 110, a voltage limiter 120, a modulator 130, a demodulator 140, a power on reset unit 150, and a clock generating unit 160.

The RFID device also includes an antenna 10 connected to the analog block. The antenna 10 transmits and receives radio frequency signals RF between an external reader or writer and the RFID device. The voltage multiplier 110 generates a power voltage VDD (which is used as the driving voltage for the RFID device) using the radio frequency signal RF received from the antenna 10. The voltage limiter 120 limits the transmission voltage of the radio frequency signal RF received from the antenna 10 and outputs the limited voltage to the demodulator 140 and the clock generating unit 160.

The modulator 130 modulates a response signal RP received from the digital block 200 and transmits the modulated signal to the antenna 10. The radio frequency signals RF received via the antenna 10 include an operating command signal. The demodulator 140 detect the operating command signal from the radio frequency signals RF received from the antenna 10 using the output voltages of the voltage multiplier 110 and the voltage limiter 120 to, and outputs a command signal CMD to the digital block 200 depending on these received signals.

The power on reset unit 150 senses the output voltage VDD of the voltage multiplier 110, and in response to the sensed output voltage VDD the voltage multiplier 110 outputs a power on reset signal POR for controlling a reset operation of the digital block 200. The clock generating unit 160 supplies a clock signal CLK to the digital block 200. The clock signal CLK is used to control the operation of the digital block 200, and the clock signal CLK is generated according to the output voltage VDD of the voltage multiplier 110.

The digital block 200 receives the power voltage VDD, the power on reset signal POR, the clock signal CLK, and the command signal CMD from the analog block 100 to analyze the command signal CMD and to generate control signals and processing signals in order to output the response signal RP to the analog block 100. The digital block 200 outputs an address ADD, input/output data I/O, a control signal CTR, a temperature sensor activating signal TEMP_CMD for driving a temperature sensor, and a temperature compensating signal CAL_CMD to the FeRAM 300.

The FeRAM 300 is a memory block used for reading/writing data and includes nonvolatile ferroelectric capacitors to which the data is written or read from. The FeRAM 300 includes a temperature treating unit 310 for detecting and compensating for temperature change state within an RFID tag chip. The temperature treating unit 310 operates in response to the temperature sensor activating signal TEMP_CMD and the temperature compensating signal CAL_CMD received from the digital block 200 and outputs the temperature change state as a voltage.

Figure 2:
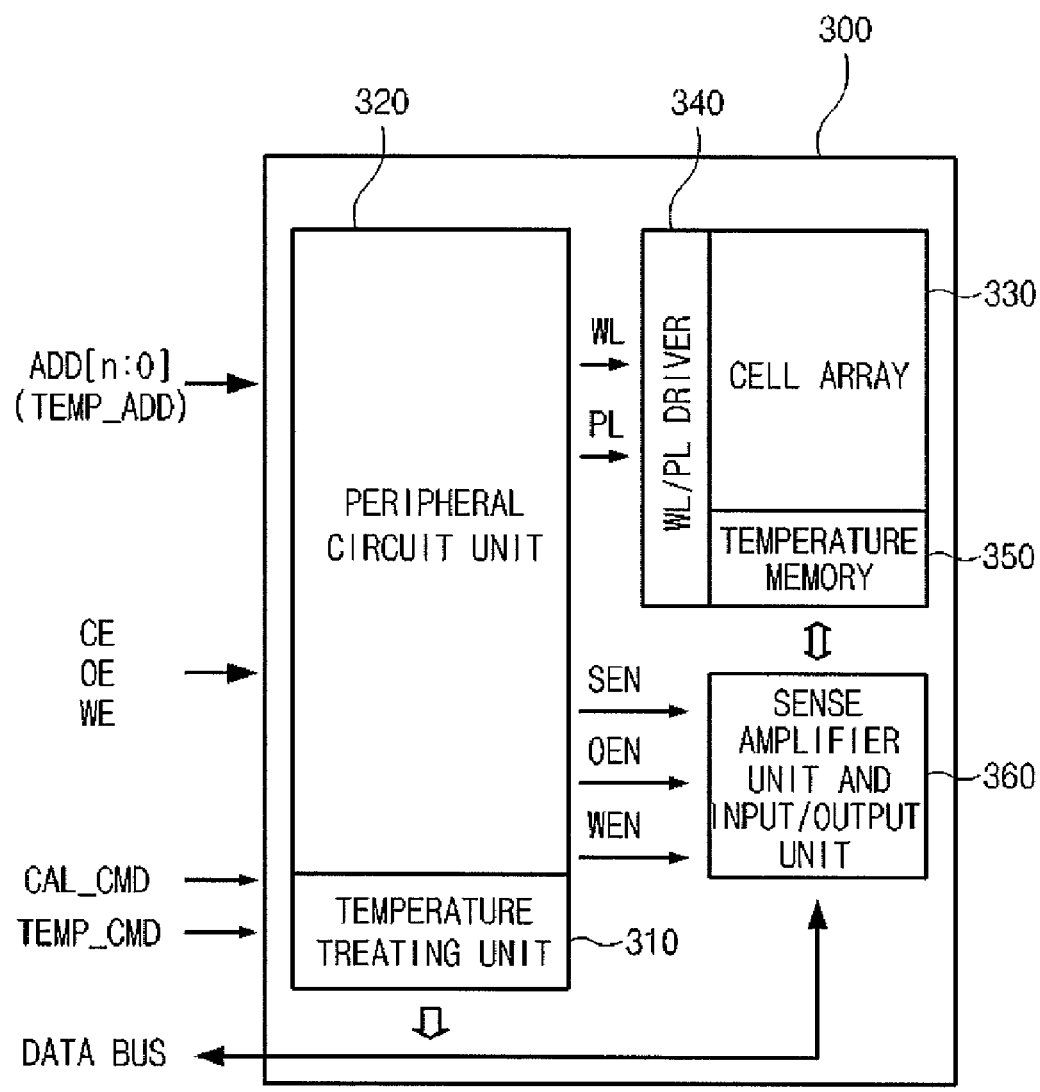
FIG. 2 is a diagram showing the memory block of FIG. 1.

FIG. 2 is a diagram showing the memory block 300 of FIG. 1.

Referring to FIG. 2, the memory block 300 includes a temperature processing unit 310, a peripheral circuit unit 320, a cell array 330, a word line/plate line driver 340, a temperature memory 350, and a sense amplifier unit and input/output unit 360.

The temperature treating unit 310 detects and compensates for a temperature change state in the RFID tag chip in response to the temperature sensor activating unit TEMP_CMD and the temperature compensating signal CAL_CMD received from the digital block 200, and converts the signals into voltages to output a digital value to a data bus.

The peripheral circuit unit 320 controls the output of a word line WL and a plate line PL for driving the cell array 330 in response to addresses ADD[n:0] received from the digital block 200, a temperature address TEMP_ADD, a chip enable signal CE, an output enable signal OE, and a write enable signal WE. The peripheral circuit unit 320 also controls the temperature treating unit 310.

The peripheral circuit unit 320 also outputs a sense amplifier enable signal SEN for adjusting the activation of sense amplifiers, an output enable signal OEN for outputting data sensed in the sense amplifiers to the data bus, and a write enable signal WEN used to control the writing of data received from the data bus to the cell array 330.

The cell array 330 includes a plurality of unit cells each having a nonvolatile ferroelectric capacitor and a switching element. Data is stored in and read from each of the nonvolatile ferroelectric capacitors of the cell array 330. The word line/plate line driver 340 is used to drive the word line WL and the plate line PL.

The temperature memory 350 receives from the data bus and stores data corresponding to the temperature detected by the temperature treating unit 310. The temperature memory 350 represents a region of the memory cell array assigned by the temperature addresses TEMP_ADD.

The sense amplifier unit and input/output unit 360 are controlled by a sense amplifier enable signal SEN, an output enable signal OEN, and a write enable signal WEN, each of which is received from the peripheral circuit unit 320. The sense amplifier unit and input/output unit 360 sense and amplify data received from the cell array 330 and output the sensed and amplified data to the data bus. The sense amplifier unit and input/output unit also transmits the data received from the data bus to the cell array 330.

Figure 3:
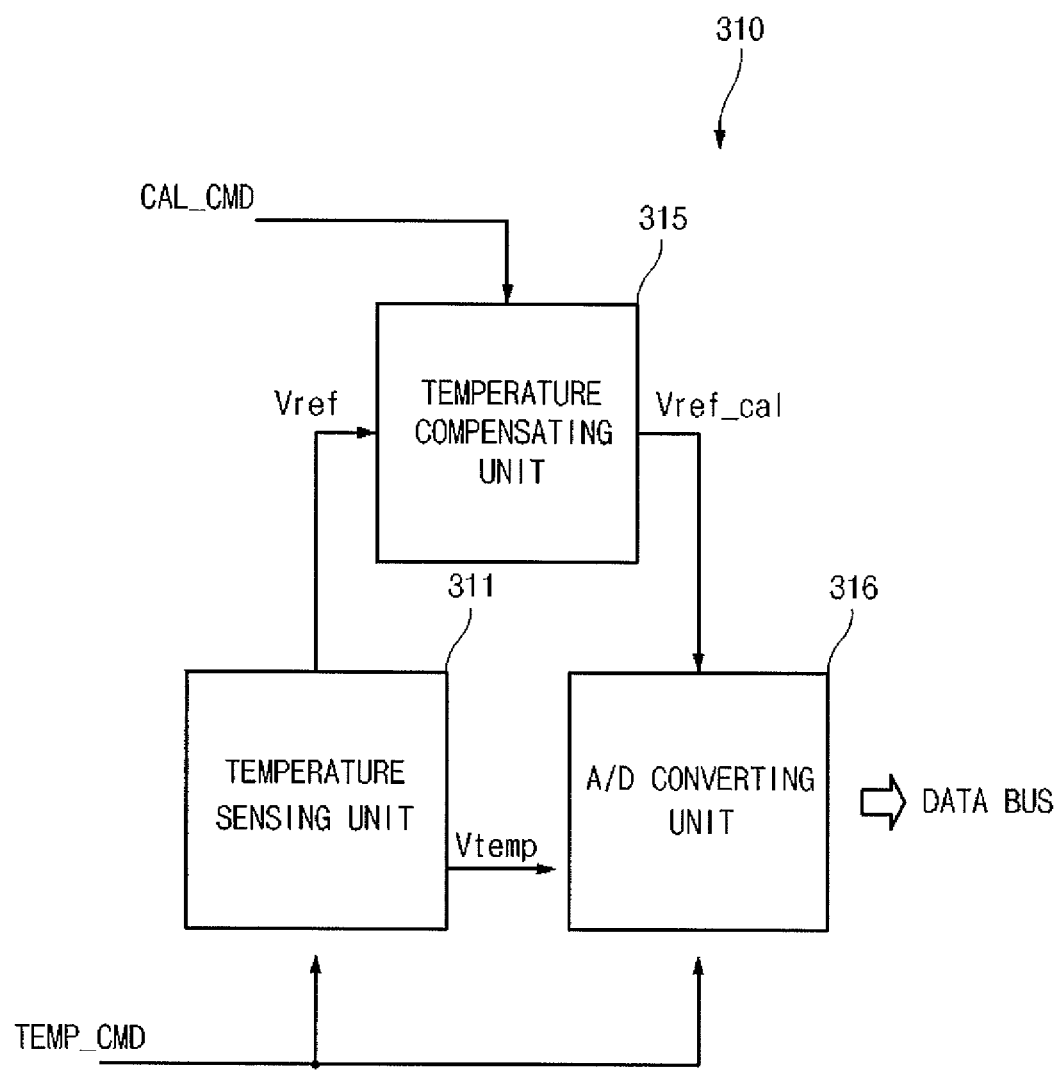
FIG. 3 is a diagram showing the temperature treating unit of FIG. 2.

FIG. 3 is a diagram showing the temperature treating unit 310 of FIG. 2.

Referring to FIG. 3, the temperature treating unit 310 includes a temperature sensing unit 311, a temperature compensating unit 315, and an A/D converting unit 316.

The temperature sensing unit 311 senses the temperature of the RFID tag chip in response to the temperature sensor activating signal received from the digital block 200, and outputs a reference voltage Vref and a temperature detecting voltage Vtemp.

The temperature compensating unit 315 compensates for the temperature of the RFID tag chip by outputting a compensating voltage Vref_cal. The temperature compensating unit 315 operates in response to the reference voltage Vref and the temperature compensating signal CAL_CMD received from the digital block 200.

The A/D converting unit 316 generates a thermometer code. The thermometer code generated by the A/D converting unit 316 depends on the compensating voltage Vref_cal and the temperature detecting voltage Vtemp. The A/D converting unit outputs a digital signal corresponding to the thermometer code to the data bus in response to the temperature sensor activating signal TEMP_CMD.

Figure 4:
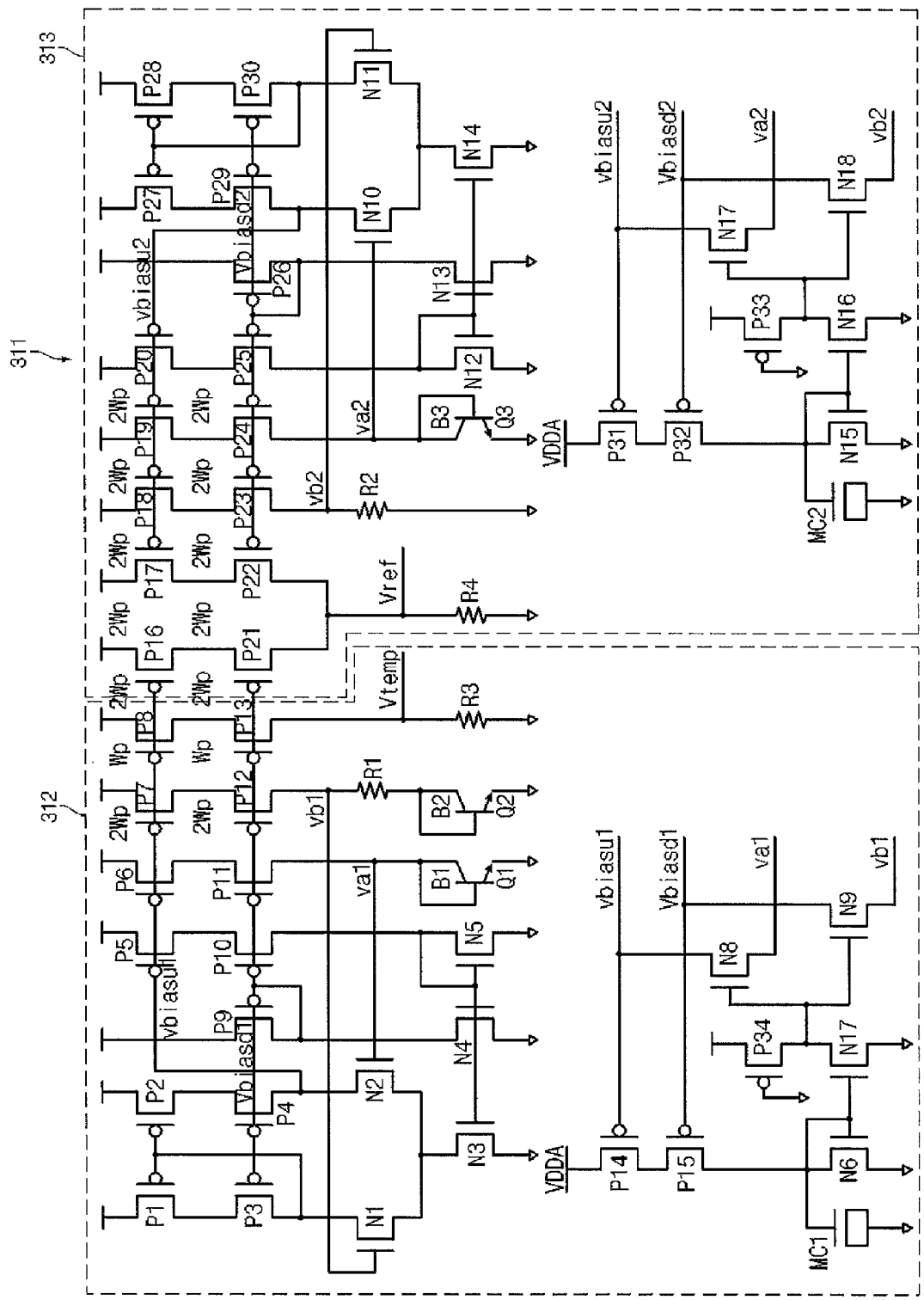
FIG. 4 is a circuit diagram showing the temperature sensing unit of FIG. 3.

FIG. 4 is a circuit diagram showing the temperature sensing unit 311 of FIG. 3.

Referring to FIG. 4, The temperature sensing unit 311 includes a temperature detecting voltage generating unit 312 and a reference voltage generating unit 313.

The temperature detecting voltage generating unit 312 outputs a temperature detecting voltage Vtemp, and includes a plurality of PMOS transistors P1~P15, P34; a plurality of NMOS transistors N1~N9; bipolar transistors B1, B2; resistors R1, R3; and a MOS capacitor MC1.

The PMOS transistors P5~P8 share a common gate which receives a bias voltage vbiasu1. The channel width of the PMOS transistors P6, P8 is two times the channel width of the PMOS transistor P7.

The PMOS transistors P9~P13 share a common gate which receives a bias voltage vbiasd1. The channel width of the PMOS transistors P11, P13 is two times the channel width of the PMOS transistor P12.

The PMOS transistors P1~P4 and the NMOS transistors N1~N3 form a comparator which compares and amplifies the output voltages of nodes va1 and vb1. The bipolar transistor B2 is larger by ten times than the bipolar transistor B1.

The PMOS transistor P14 is selectively switched depending on the voltage level of the bias voltage vbiasu1. The PMOS transistor P15 is selectively switched depending on the voltage level of the bias voltage vbiasd1.

Figure 5:
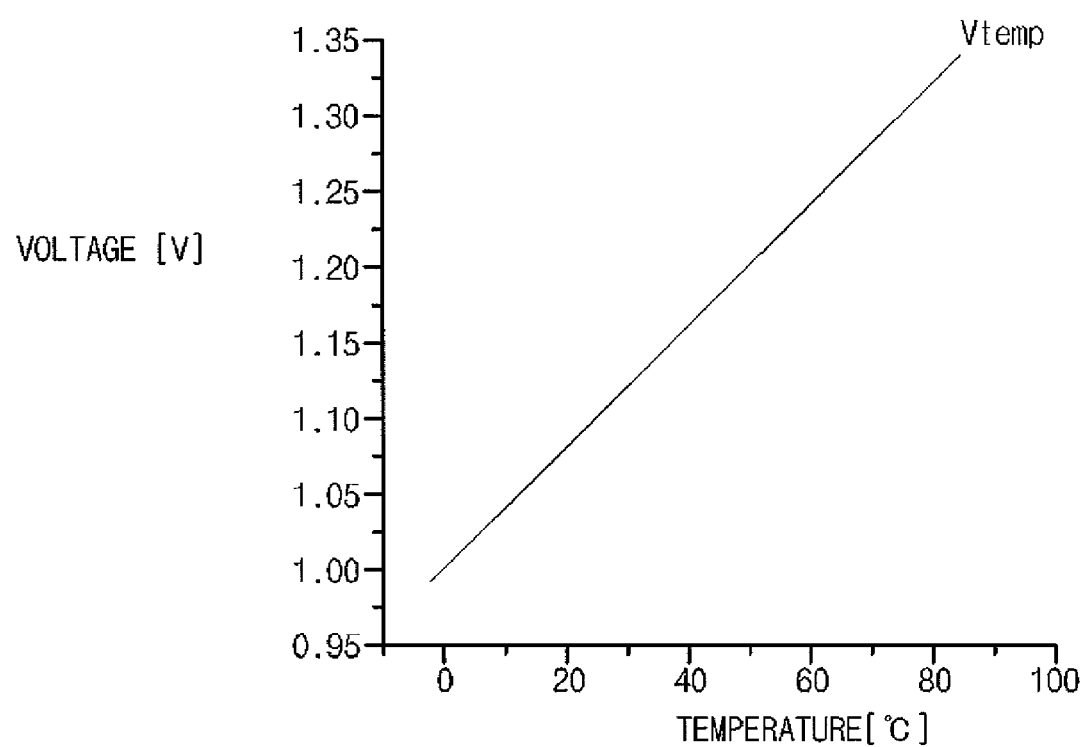
FIG. 5 is a graph shown for illustrating the temperature characteristics of the temperature sensing unit of FIG. 3.

In the temperature detecting voltage generating unit 312 of FIG. 5, the temperature detecting voltage Vtemp increases when the temperature increases. That is, the voltage level of the temperature detecting voltage Vtemp increases proportionally to an increase in temperature.

The temperature detecting voltage Vtemp corresponding to temperature change can be represented by the following [Equation 1].

$$\text{Temperature detecting voltage } V\text{temp} = (2VT \ln 20/R1) \times R3. \quad [\text{Equation 1}]$$

In equation 1, the voltage VT represents the thermometer voltage. As one can see when referring to equation 1, the temperature detecting voltage Vtemp changes according to the temperature change (the change in the thermometer voltage) of the RFID device.

The reference voltage generating unit 313 outputs a reference voltage Vref, and includes a plurality of PMOS transistors P16~P33; a plurality of NMOS transistors N10~N18; a bipolar transistor B3; resistors R2, R4; and a MOS capacitor MC2.

The PMOS transistors P17~P20 share a common gate which receives a bias voltage vbiasu2. The channel width of each of the PMOS transistors P16~P24 is the same. The PMOS transistors P22~P26, P29, P30 share a common gate which receives a bias voltage vbiasd2. The PMOS transistors P27~P30 and the NMOS transistors N10, N11, N14 form a comparator which compares and amplifies the output voltages of nodes v21 and va2.

The PMOS transistor P31 is selectively switched depending on the voltage level of the bias voltage vbiasu2. The PMOS transistor P32 is selectively switched depending on the voltage level of the bias voltage vbiasd2.

The reference voltage generating unit 313 a voltage value that remains constant even with a change in temperature. The reference voltage Vref can be represented by the following [Equation 2].

$$\text{Reference voltage } V\text{ref} = R4 \times ((2VT \ln 20/R1) + (VBE3/R2)) \quad [\text{Equation 2}]$$

The voltage VT represents a thermometer voltage, and the voltage VBE3 represents a voltage flowing from a base terminal of the bipolar transistor B3 into the emitter terminal. Generally, the voltage VT has a KT/q value as a temperature value. In equation 2, the reference voltage Vref does not change with the temperature of the RFID device.

Figure 6:
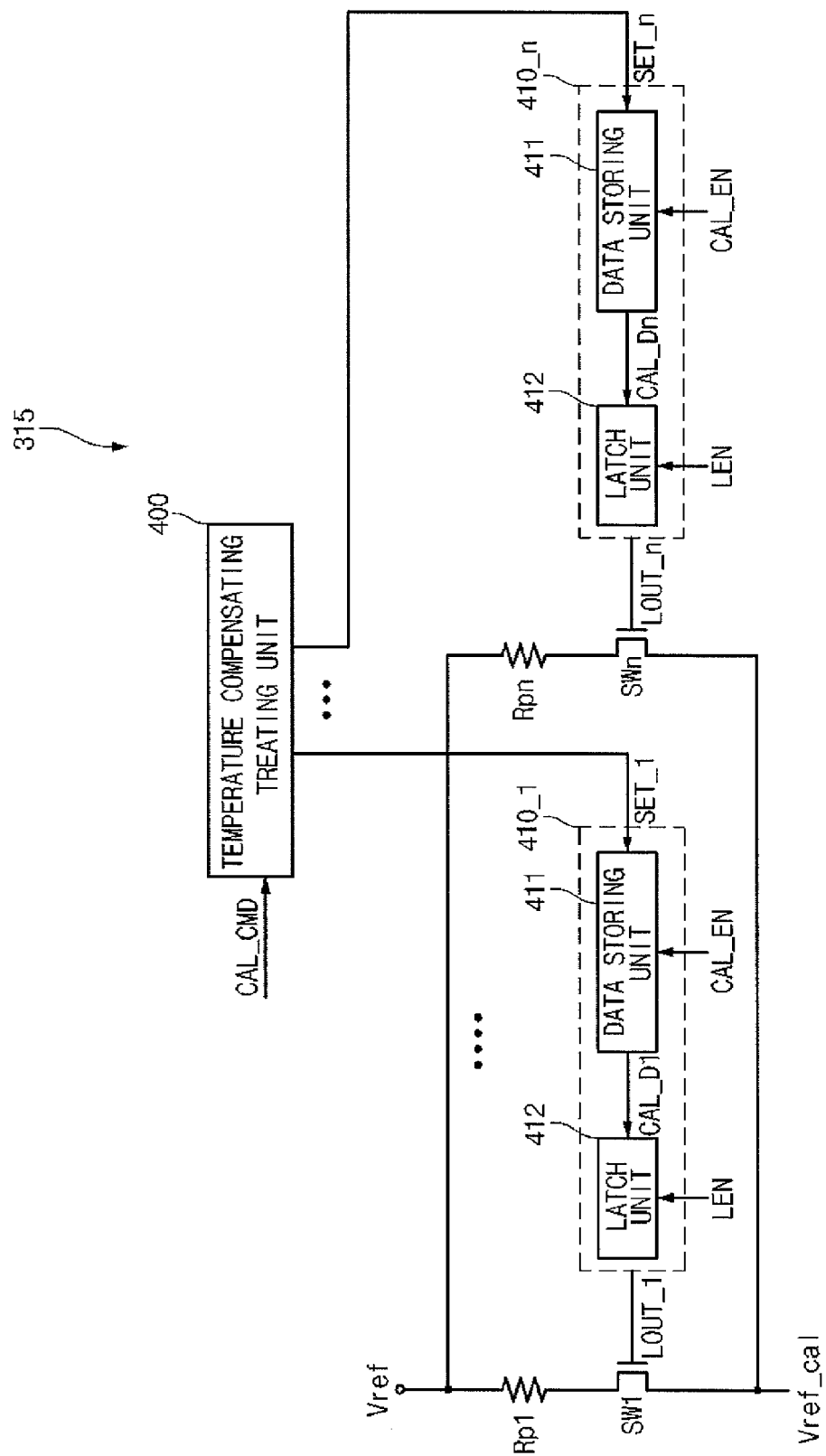
FIG. 6 is a diagram showing the temperature compensating unit of FIG. 3.

FIG. 6 is a diagram showing the temperature compensating unit 315 of FIG. 3.

Referring to FIG. 6, the temperature compensating unit 315 includes a temperature compensating treating unit 400, a plurality of resistors Rp1~Rpn, a plurality of switching elements SW1~SWn and a plurality of nonvolatile code units 410_1~410_n. Each of the nonvolatile code units 410_1~410_n includes a data storing unit 411 and a latch unit 412.

The temperature compensating treating unit 400 outputs set signals SET_1~SET_n for compensating temperature in response to the temperature compensating signal CAL_CMD, and the nonvolatile code units 410_1~410_n receive the respective set signals SET_1~SET_n. Each of the set signals SET_1~SET_n includes data D/DB, a pull-up enable signal ENP, a cell plate signal CPL, and a pull-down enable signal ENN.

The resistor Rp1 is connected between a reference voltage Vref receiving terminal and the switching element SW1. The switching element SW1 is connected between the resistor Rp1 and a compensating voltage Vref_cal output terminal, and the gate of the switching element SW1 receives a latch output signal LOUT_1 from the latch unit 412 of the nonvolatile code unit 410_1.

The resistor Rpn corresponds to the code unit 410_n and is connected between the reference voltage Vref receiving terminal and the switching element SWn. The switching element SWn is connected between the resistor Rpn and a compensating voltage Vref_cal output terminal, and the gate of the switching element SWn receives a latch output signal LOUT_n from the latch unit 412 of the nonvolatile code unit 410_n.

The data storing unit 411 is controlled by a measuring enable signal CAL_EN. The data storing unit 411 stores data D in a nonvolatile register in response to a set signal SET, and outputs measuring data CAL_D to the latch unit 412. The measuring enable signal CAL_EN is a signal enabled when writing the data D in the nonvolatile register.

The latch unit 412 latches the measuring data CAL_D in response to a latch enable signal LEN, and outputs the latch output signal LOUT to the switching element. The latch enable signal LEN is obtained by performed an OR logical operation on the measuring enable signal CAL_EN and a power transition detecting signal PTD. That is, the latch enable signal LEN is enabled when one of the measuring enable signal CAL_EN and the power transition detecting signal PTD is activated.

The temperature compensating unit 315 provides a variable voltage drop from the reference voltage Vref output terminal to the compensating voltage Vref_cal output terminal. The voltage drop depends on the number of switching elements SW1~SWn that are turned on. That is, the reference voltage Vref minus a voltage drop value provided by the temperature compensating unit 315 is the compensating voltage Vref_cal.

The switching elements SW1~SWn are turned on in response to output signals of the nonvolatile code units 410_1~410_n. As more switching elements SW1~SWn are turned on the resistance value between the reference voltage Vref and the compensating voltage Vref_cal becomes lower and the difference in voltage between the reference voltage Vref and the compensating voltage Vref_cal is therefore smaller.

The voltage drop becomes greater when only one switching element SW1 of the switching elements SW1~SWn is turned on in response to the output signals of the nonvolatile code units 410_1~410_n. When only one switching element is turned on, the resistance value of the compensating voltage Vref_cal output terminal becomes greater, and therefore there is a large difference between the reference voltage Vref and the compensating voltage Vref_cal.

Figure 7:
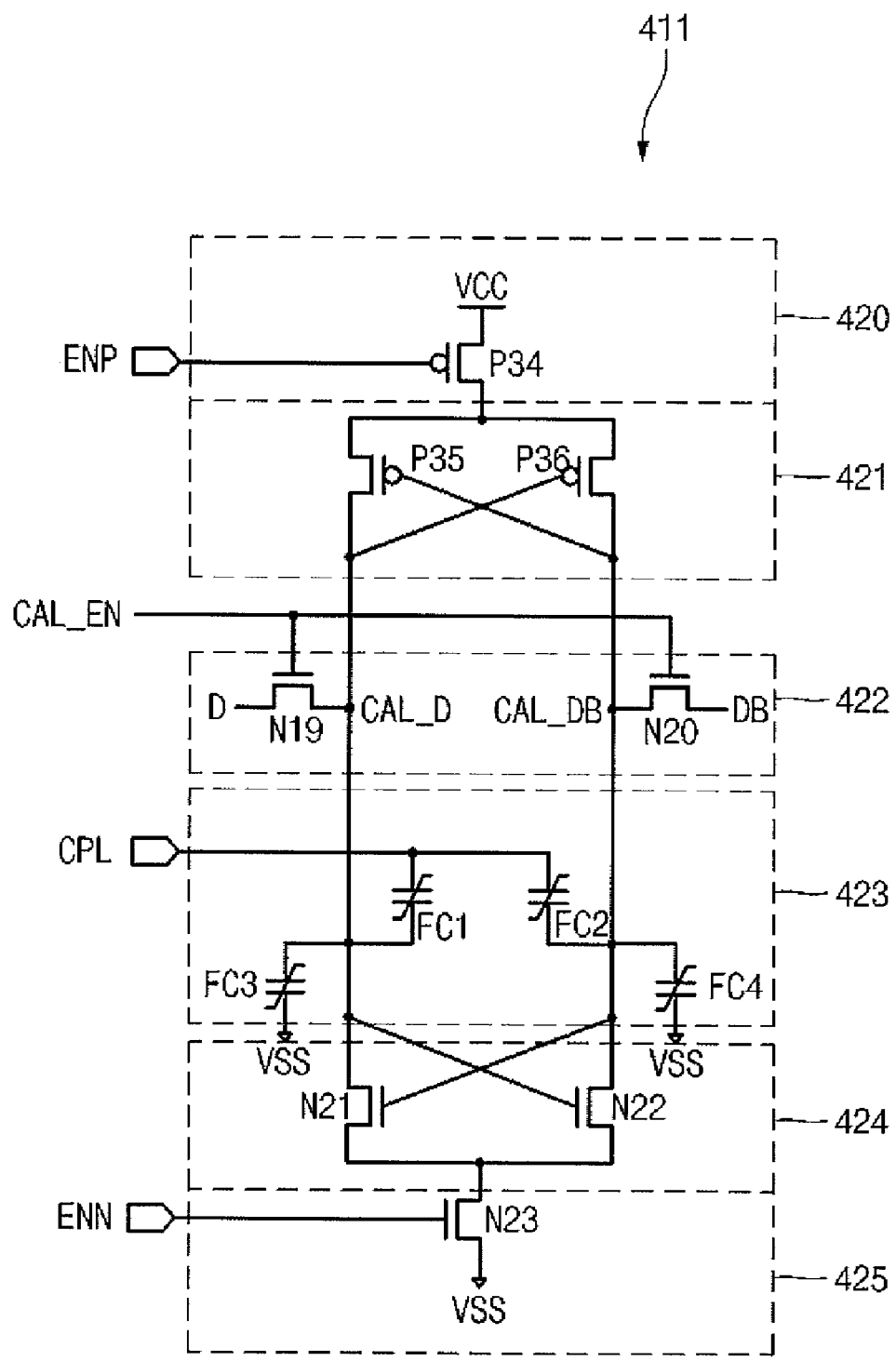
FIG. 7 is a circuit diagram showing the data storing unit of FIG. 6.

FIG. 7 is a circuit diagram showing the data storing unit 411 of FIG. 6.

Referring to FIG. 7, the data storing unit 411 includes a pull-up unit 420, a pull-up latch unit 421, an input/output unit 422, a nonvolatile storage capacitor unit 423, a pull-down latch unit 424 and a pull-down unit 425.

The pull-up unit 420 includes a PMOS transistor P34 connected between a power voltage VCC receiving terminal and the pull-up latch unit 421. The gate of the PMOS transistor P34 receives a pull-up enable signal ENP.

The pull-up latch unit 421 includes PMOS transistors P35, P36. Each of the PMOS transistors P35, P36 is connected between the PMOS transistor P34 and the input/output unit 422, and the gates of the PMOS transistors P35, P36 are cross-coupled.

The input/output unit 422 includes NMOS transistors N19, N20. The NMOS transistor n19 is connected between a measuring data CAL_D output terminal and a data D input terminal, and the gate of the NMOS transistor N19 receives the measuring enable signal CAL_EN. The NMOS transistor N20 is connected between a measuring data CAL_DB output terminal and a data DB input terminal, and the gate of the NMOS transistor N20 also receives the measuring enable signal CAL_EN.

The nonvolatile storage capacitor unit 423 includes a plurality of nonvolatile ferroelectric capacitors FC1~FC4. The nonvolatile ferroelectric capacitors FC1, FC2 are connected between a cell plate signal CPL receiving terminal and respective measuring data CAL_D, CAL_DB output terminals. The nonvolatile ferroelectric capacitors FC3, FC4 are connected between respective measuring data CAL_D CAL_DB output terminals and a ground voltage terminal.

The pull-down latch unit 424 includes NMOS transistors N21, N22. Each of the NMOS transistors N21, N22 is connected between the nonvolatile storage capacitor unit 423 and the NMOS transistor N23, and the gates of the NMOS transistors N21, N22 are cross-coupled. The pull-down unit 425 includes an NMOS transistor N23 connected between the pull-down latch unit 242 and the ground voltage terminal. The gate of the NMOS transistor N23 receives a pull-down enable signal ENN.

Figure 8:
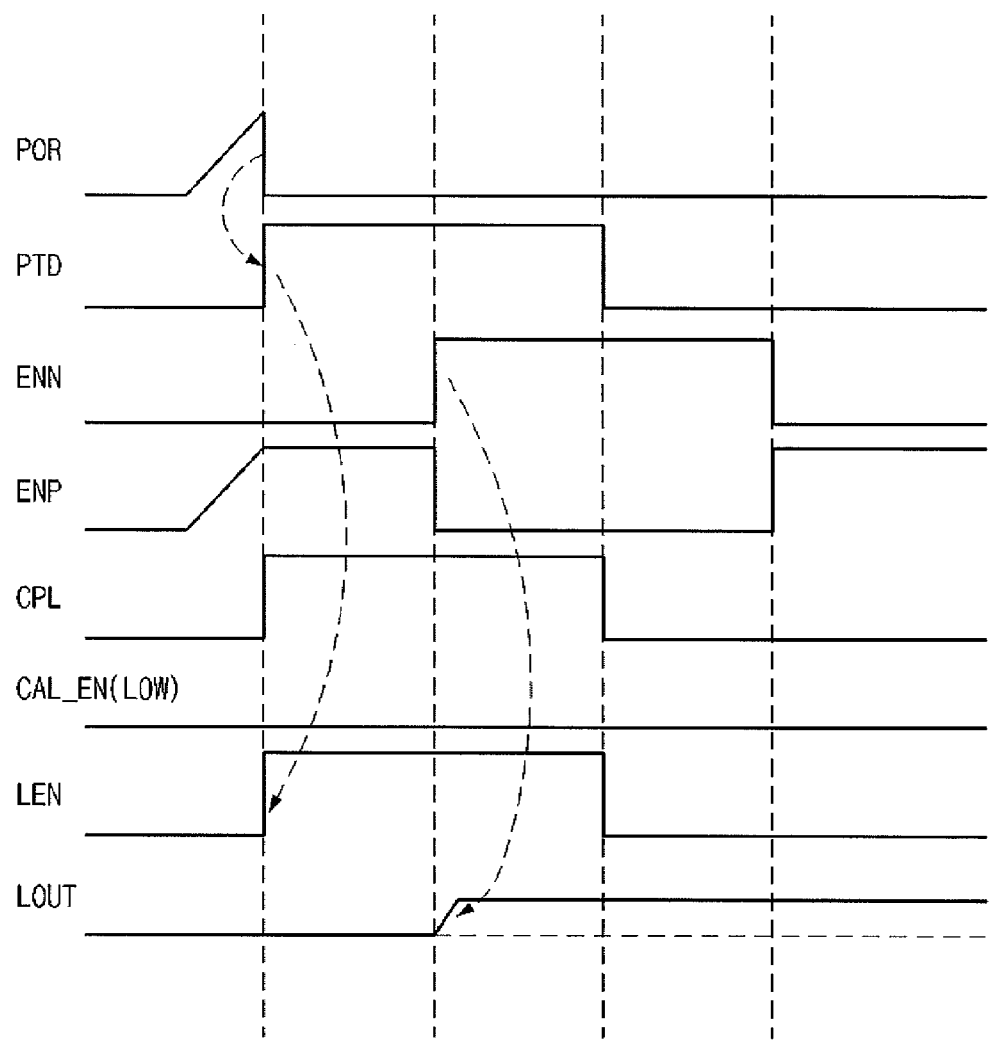
FIGS. 8 and 9 are timing diagrams shown for illustrating the operation of the nonvolatile code unit of FIG. 6.
Figure 9:
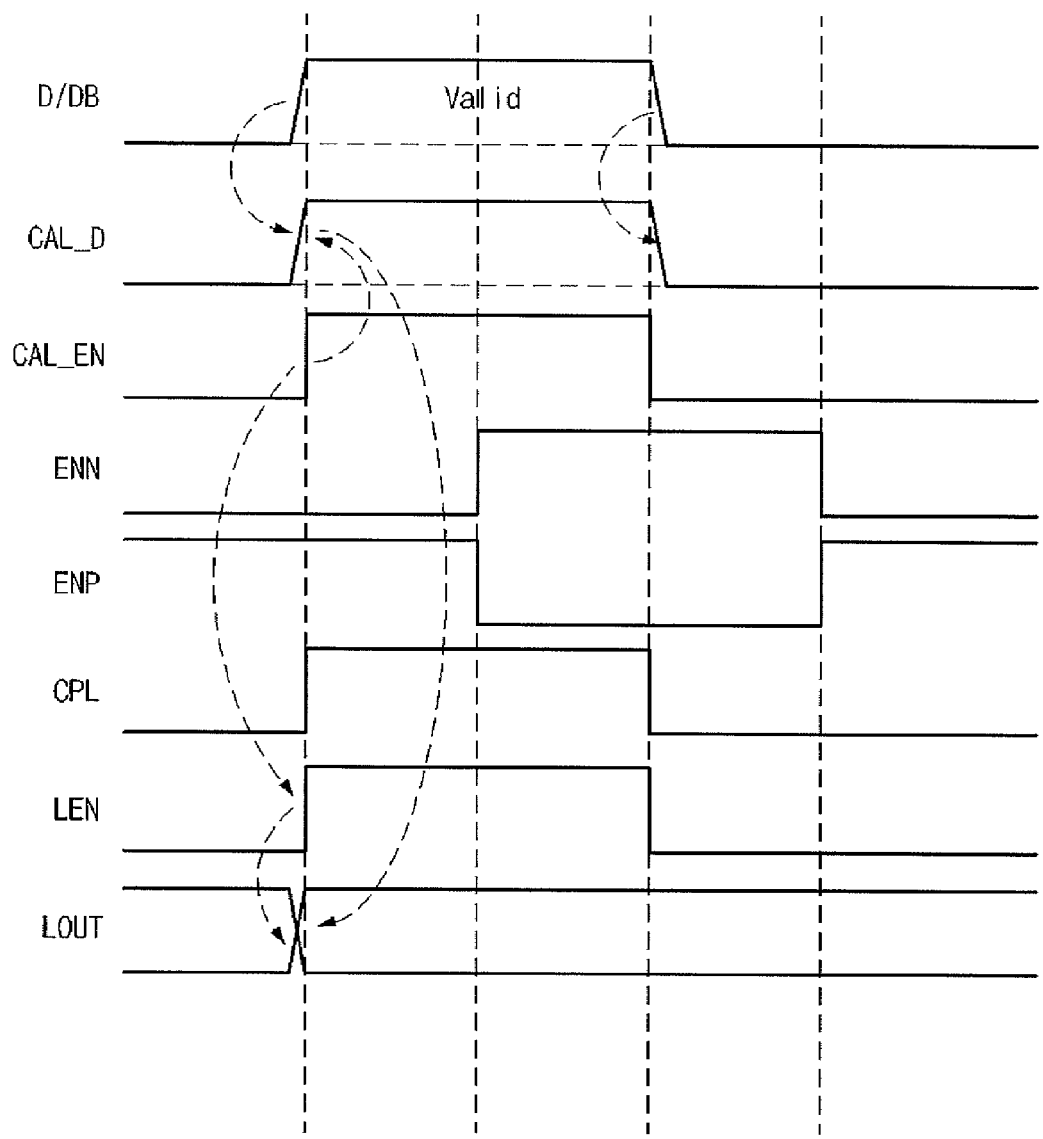

FIGS. 8 and 9 are timing diagrams shown for illustrating the operation of the nonvolatile code unit 410_n. FIG. 8 illustrates a data restoration operation of the nonvolatile code unit 410_n when the power source is turned on. FIG. 9 illustrates the process of setting data in the nonvolatile code unit 410 when the measuring data CAL_D is transited.

Referring to FIGS. 1 and 6-8, when the data restoration operation is performed, the voltage level of the power-on reset signal POR is gradually increased and then transited to a low level. In this case, the power transition detecting signal PTD transits to a high level, is delayed for a given time, and then transits to a low level.

The cell plate signal CPL transits to a high level when the power-on reset signal POR transits to a low level, and to a low level when the power transition detecting signal PTD is transited to a low level.

As the voltage level of the power-on reset signal POR gradually increases, the voltage level of the pull-up enable signal ENP also gradually increased. The pull-up enable signal ENP maintains the high level when the power-on reset signal POR transits to the low level.

Once a given time passes after the power transition detecting signal PTD is transited to the high level, the pull-down enable signal ENN is transited to a high level. When the pull-down enable signal ENN is transited to the high level, the pull-up enable signal ENP is transited to a low level.

While the power transition detecting signal PTD maintains the high level, the latch enable signal LEN also maintains a high level (as described above, LEN is the result of an OR logical operation performed on the measuring enable signal CAL_EN and the power transition detecting signal PTD). The measuring enable signal CAL_EN maintains a low level during the duration of the data restoration operation. When the pull-down enable signal ENN is activated, the latch output signal LOUT is also activated.

Referring to FIGS. 1, 6-7 and 9, which show the process of setting data in the non-volatile code unit, during the period in which the data D/DB is valid, the voltage level of the measuring data CAL_D is transited to a high level depending on the activation of the measuring enable signal CAL_EN. The cell plate signal CPL maintains a high level as long as the measuring enable signal CAL_EN is activated (a high level). When the measuring enable signal CAL_EN is transited to a low level, the cell plate signal CPL is also transited to a low level.

Once a given time passes after the measuring enable signal CAL_EN is transited to the high level, the pull-down enable signal ENN is transited to the high level. When the pull-down enable signal ENN is transited to the high level, the pull-up enable signal ENP is transited to the low level.

When the measuring enable signal CAL_EN is activated (high level), the latch enable signal LEN is also activated (LEN is the result of an OR logical operation performed on the measuring enable signal CAL_EN and the power transition detecting signal PTD). As a result, the measuring data CAL_D is latched by the latch unit 412 and is outputted from the latch unit 412 as the latch output signal LOUT.

Figure 10:
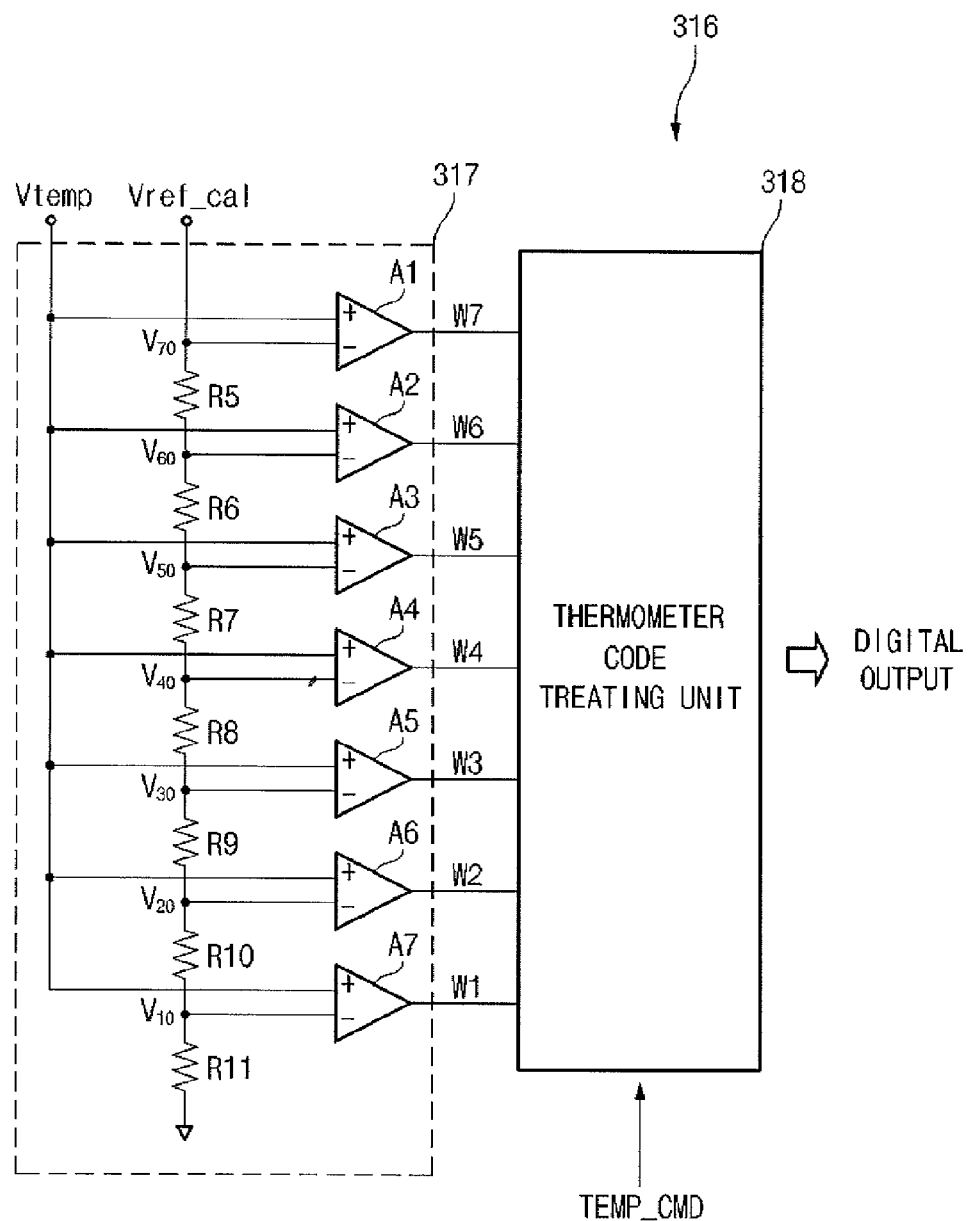
FIG. 10 is a diagram showing the A/D converting unit of FIG. 3.

FIG. 10 is a diagram showing the A/D converting unit 316 of FIG. 3.

Referring to FIG. 10, the A/D converting unit 316 includes a thermometer code generating unit 317 and a thermometer code treating unit 318.

The thermometer code generating unit 317 includes a plurality of resistors R5~R11 and a plurality of comparators A1~A7. The resistors R5~R11 are connected in series between a compensating voltage Vref_cal receiving terminal and the ground voltage terminal. In FIG. 10, V10~V70 represent voltage values corresponding to detected temperature values.

Each of the comparators A1~A7 has a positive (+) input terminal that receives the temperature detecting voltage Vtemp and a negative (−) input terminal that receives a respective one of the voltages V70~V10 of the corresponding connection node between the resistors R5~R11 so as to output code signals W7~W1.

The thermometer code treating unit 318 treats the code signals W7~W1 received from the thermometer code generating unit 317 in response to the temperature sensor activating signal TEMP_CMD so as to output a digital signal.

Figure 11:
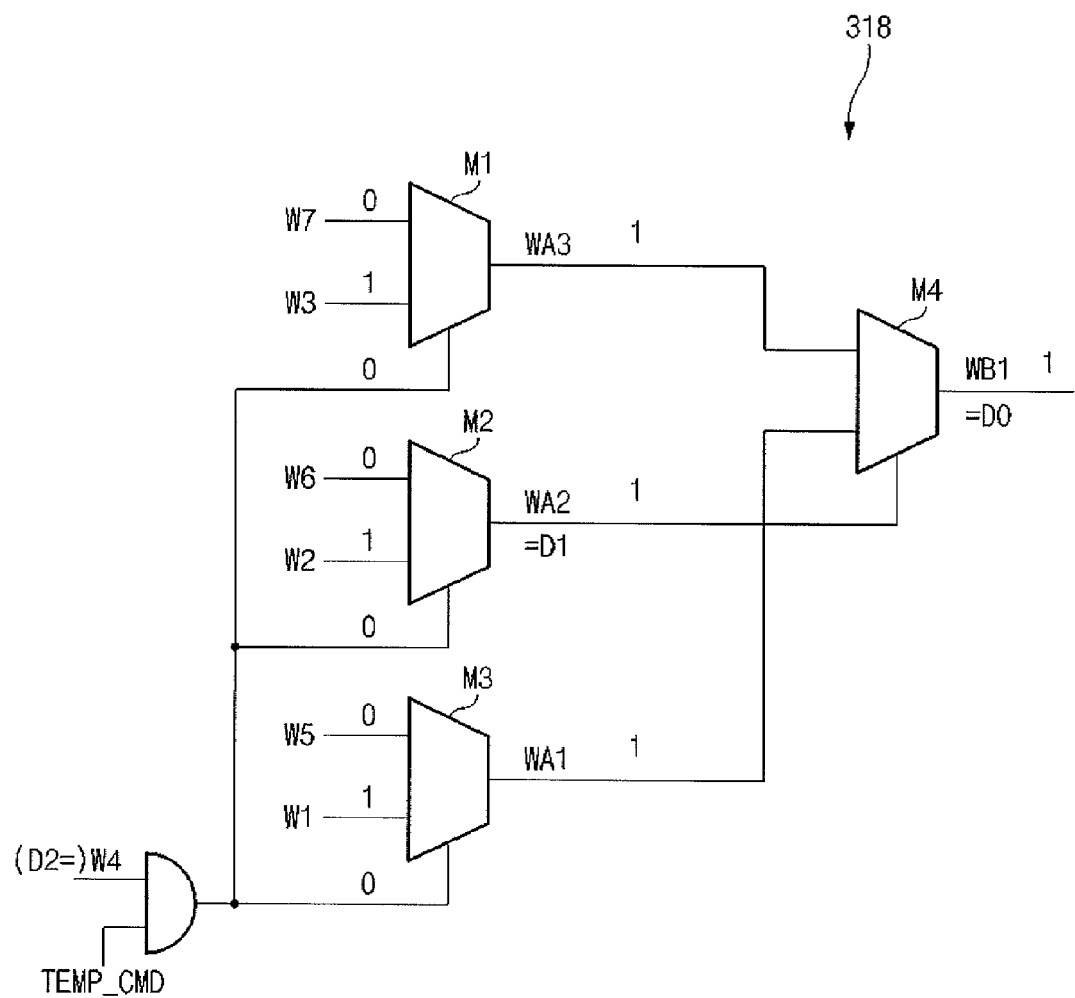
FIG. 11 is a diagram showing the thermometer code treating unit of FIG. 10.

FIG. 11 is a diagram showing the thermometer code treating unit 318 of FIG. 10.

The thermometer code treating unit 318 includes a plurality of selecting units M1~M4. Each of the selecting units M1~M4 comprises a multiplexer.

The selecting unit M1 selects one of the code signals W7, W3 in response to a signal obtained by performing an AND logical operation on the temperature sensor activating signal TEMP_CMD and the code signal W4 so as to output a code signal WA3. That is, when the code signal W4 is activated and the temperature sensor activating signal TEMP_CMD is activated, the inputs of the selecting units M1~M3 are activated.

The selecting unit M2 selects one of the code signals W6, W2 in response to the code signal W4 so as to output a code signal WA2. The selecting unit M3 selects one of the code signals W5, W1 in response to the code signal W4 so as to output a code signal WA1. The selecting unit M4 selects one of the code signals WA3, WA1 in response to the code signal WA2 so as to output a code output signal WB1.

The operation of outputting the digital code output signal WB1 in response to the code signals W7~W1 in the thermometer code treating unit 318 is performed as shown in Table 1.

TABLE 1

| | | |
|---|---|---|
| INPUT | W7  | 0 0 0 0 0 0 0 1 |
|       | W6  | 0 0 0 0 0 0 1 1 |
|       | W5  | 0 0 0 0 0 1 1 1 |
|       | W4  | 0 0 0 0 1 1 1 1 |
|       | W3  | 0 0 0 1 1 1 1 1 |
|       | W2  | 0 0 1 1 1 1 1 1 |
|       | W1  | 0 1 1 1 1 1 1 1 |
|       | WA3 | 0 0 0 1 0 0 0 1 |
|       | WA2 | 0 0 1 1 0 0 1 1 |
|       | WA1 | 0 1 1 1 0 1 1 1 |
|       | WB1 | 0 1 1 0 1 0 1 1 |
| OUTPUT | D2 | 0 0 0 0 1 1 1 1 |
|        | D1 | 0 0 1 1 0 0 1 1 |
|        | D0 | 0 1 1 0 1 1 0 1 |

Table 1 shows 8 possible input sequences arranged vertically in the 3rd column of table 1 (e.g. the first vertical sequence is '0000000', the second vertical sequence is '0000001' and the last vertical sequence is '1111111'). The eight different input sequences result in 8 different sequences for WA3~WA1, WB1. These eight different sequences are arranged vertically in col. 3 of table 1 (e.g. the first sequence is '0000', the second sequence is '0011', and the last sequence is '1111'. The digital output of the thermometer code treatment unit 318 are the D2~D0 values. As shown in FIG. 11, D2=W4, D1=WA2, and D0=WB1. The 8 possible input sequences result in 8 possible output sequences, which are also arranged vertically in col. 3 of table 1 (e.g. the first possible sequence is '000', the second possible sequence is '001', and the final possible sequence is '111'.

As a further example, which is exemplified in FIG. 11, when the code signals W7~DW1 (which are input signals) are sequentially, '0000111' (the fourth vertical sequence), the code signals WA3~WA1 outputted from the selecting units M1~M3 are '111'. That is, when the code signal W4 is '0', the selecting unit M1 selects the code signal W3 to output the code signal WA3, selects the code signal W2 to output the code signal WA2, and selects the code signal W1 to output the code signal WA1.

When the code signal WA2 is '1', the selecting unit M4 selects the code signal WA1 to output the code output signal WB1. Final output signals D0~D2 are outputted as digital code values of '110', where D0 is the output of M4, D1 is the output of M2, and D2 is W4.

Figure 12:
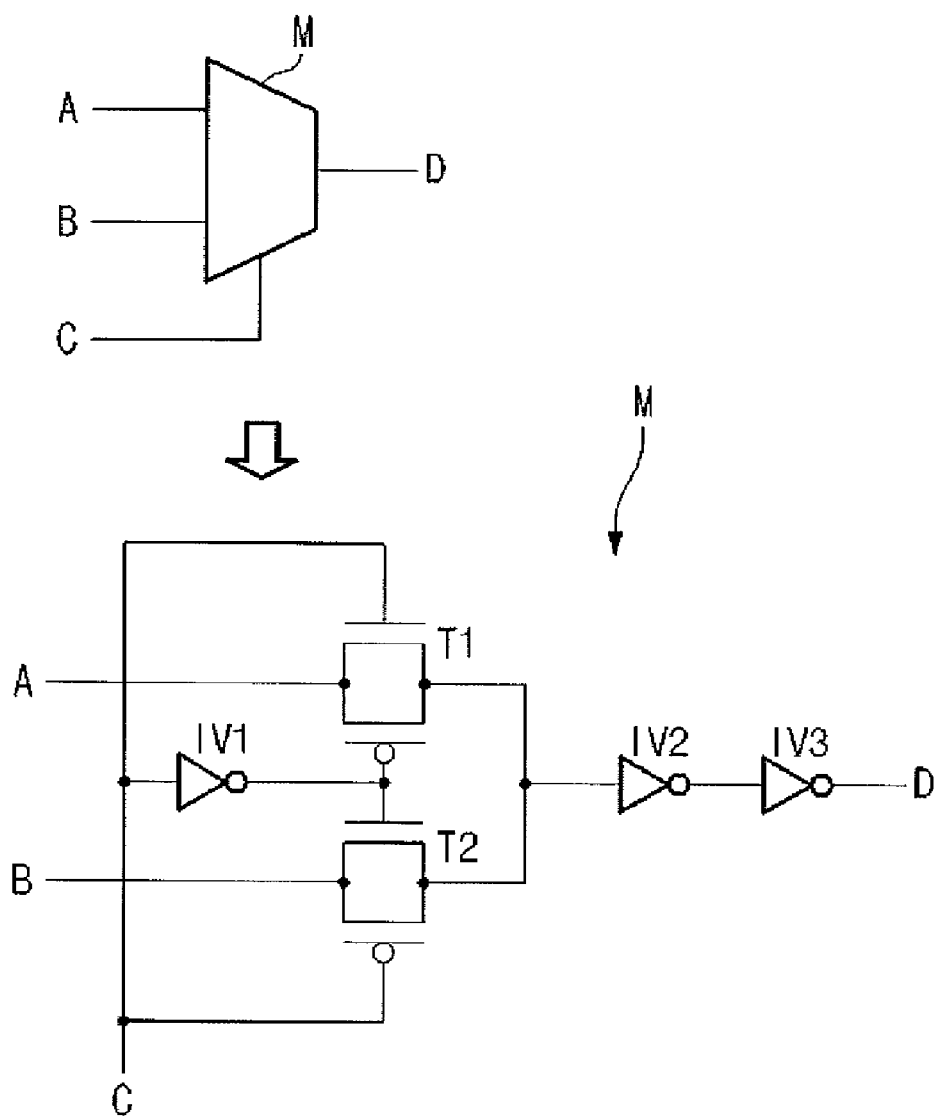
FIG. 12 is a circuit diagram showing the selecting unit of FIG. 11.

FIG. 12 is a circuit diagram showing an example of one of the selecting units M1~M4 of FIG. 11. In FIG. 12, input signals 'A', 'B', and a control signal C are inputted into the selecting unit M for selecting one of the input signals 'A', 'B'. The output signal of the selecting unit M is 'D'.

The selecting unit M includes transmission gates T1, T2 and inverters IV1~IV3. The transmission gate T1 selectively outputs the input signal A in response to the control signal C. The transmission gate T2 selectively outputs the input signal B in response to the control signal C.

When the control signal C is at a high level, the transmission gate T1 is turned on to output the input signal A, and the transmission gate T2 is turned off. When the control signal C is at a low level, the transmission gate T2 is turned on to output the input signal B, and the transmission gate T1 is turned off. The inverters IV2, IV3 delay the selected output signal of the transmission gate T1 or T2 to output the delayed selected signal as output signal D.

Figure 13:
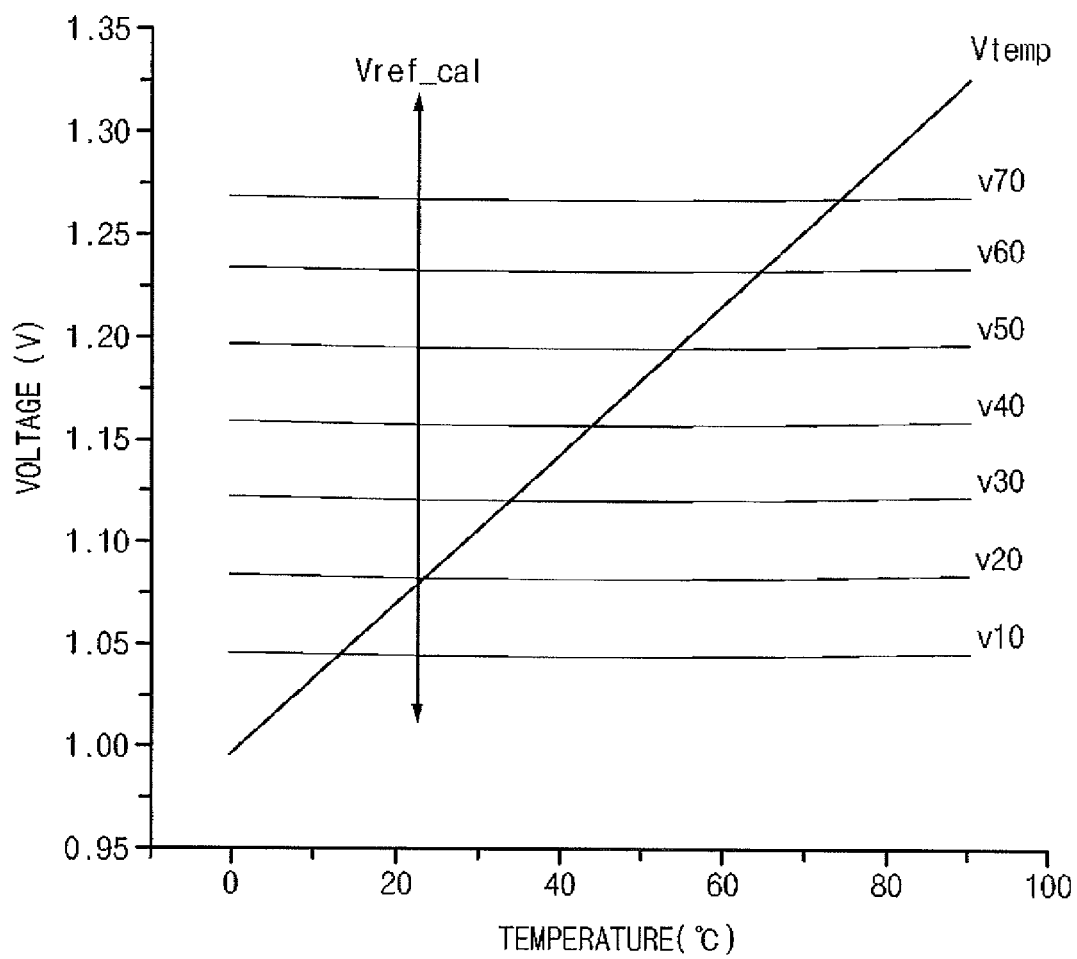
FIGS. 13 and 14 are graphs shown for illustrating characteristics of the thermometer code treating unit of FIG. 10.

Referring to FIGS. 10 and 13, the A/D converting unit 316 compares the temperature detecting voltage Vtemp to the compensating voltage Vref_cal to output the W1~W7 values. The compensating voltage Vref_cal is compared to the reference voltage Vref, and the changed value is compensated.

Figure 14:
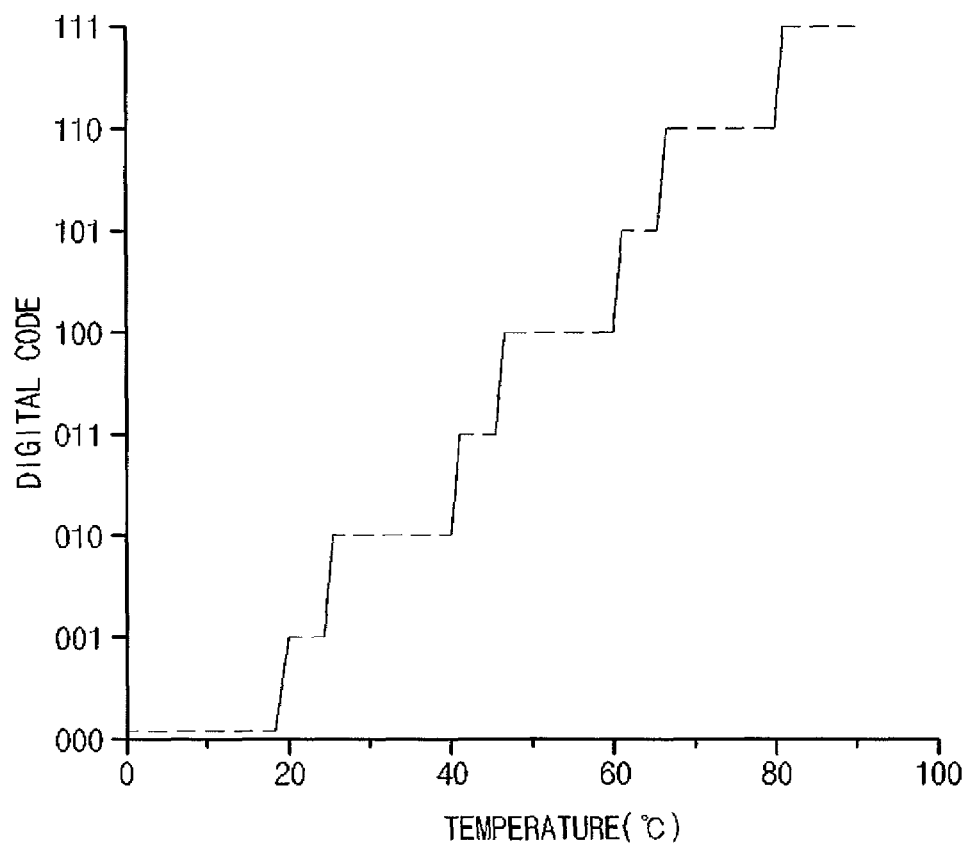

A value of the temperature detecting voltage Vtemp may be changed in an actual process of each RFID tag. The compensating voltage Vref_cal is changed so as to be a voltage corresponding to a previously set temperature. As a result, an error range of the temperature detecting voltage Vtemp out of the reference value is compensated. As shown in FIG. 14, the changed value is converted into a digital code value depending on temperature and outputted to the data bus.

Figure 15:
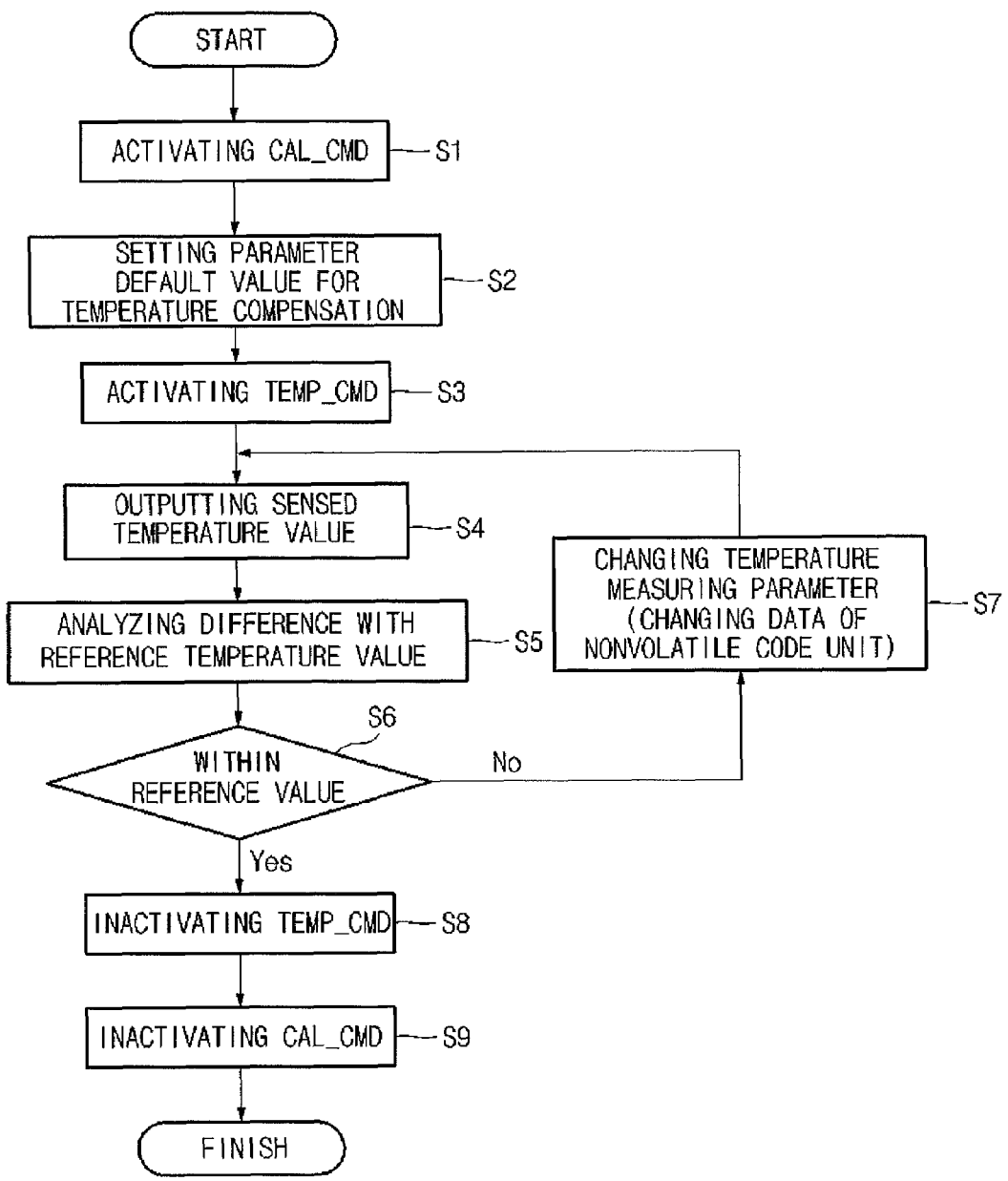
FIG. 15 is a flow chart shown for illustrating the operation of the temperature treating unit of FIG. 2.

FIG. 15 is a flow chart shown for illustrating the operation of the temperature treating unit 310 of FIG. 2.

When the temperature compensating signal CAL_CMD is activated (step S1), a default value of a parameter for compensating temperature is set in the nonvolatile code units 410_1~410_n (step S2).

When the temperature sensor activating signal TEMP_CMD is activated (step S3), a temperature value sensed in the temperature sensing unit 311 is outputted as the reference voltage Vref and the temperature detecting voltage Vtemp (step S4).

The temperature compensating unit 315 compares the reference voltage Vref to a reference temperature value previously set in the nonvolatile code unit 410_~410_n to output the compensating voltage Vref_cal (step S5). Then, a determination is made as to whether the reference voltage Vref is within a previously set temperature value range (step S6).

If the reference voltage Vref is not within the previously set temperature value range, the data stored in the nonvolatile code units 410_1~410_n is changed to alter the value of the temperature measuring parameter (step S7). If the reference voltage Vref is within the previously set temperature value range, the temperature sensor activating signal TEMP_CMD is inactivated (step S8).

When the temperature sensor activating signal TEMP_CMD is inactivated, the temperature compensating signal CAL_CMD is inactivated (step S9).

The operational principles of the RFID device according to an embodiment of the present invention will now be described.

The digital block 200 outputs the temperature sensor activating signal TEMP_CMD and the temperature compensating signal CAL_CMD to the temperature treating unit 310 so that temperature change state in an RFID tag chip can be detected. The digital block 200 outputs the temperature address TEMP_ADD to the peripheral circuit unit 320 of the memory block 300 in order to allot a given region of the cell array 330 for the temperature change information.

The temperature treating unit 310 detects a temperature change state of the RFID tag chip in response to the temperature sensor activating signal TEMP_CMD and the temperature compensating signal CAL_CMD, and converts the state into a voltage so that a digital output signal can be output to the data bus.

The peripheral circuit unit 320 controls the word line WL and the plate line PL (which are used to drive the temperature memory 350) according to the temperature address TEMP_ADD received from the digital block 200. The peripheral circuit unit 320 also controls the temperature treating unit 310. The temperature memory 350 receives data corresponding to the temperature detected by the temperature treating unit 310 via the data bus and the input/output unit 360, and stores the received data.

The temperature sensing unit 311 senses the temperature of the RFID tag chip in response to the temperature sensor activating signal TEMP_CMD received from the digital block 200 to output the reference voltage Vref to the temperature compensating unit 315 and to output the temperature detecting voltage Vtemp to the A/D converting unit 316.

The thermometer code generating unit 317 of the A/D converting unit 316 resistance-divides a temperature code range into N sections using the resistors R5~R11 based on the compensating voltage Vref_cal. The n-divided temperature code ranges V70~V10 are compared to the temperature detecting voltage Vtemp so that N thermometer code signals W7~W1 are generated.

The thermometer code treating unit 318 decodes the thermometer code signals W7~W1 in response to the temperature sensor activating signal TEMP_CMD so as to output a digital output signal to the data bus.

As mentioned above, a plurality of the temperature addresses TEMP_ADD are allotted in a plurality of the temperature memory regions 350. Each temperature address is selectively read or written by a reader of the RFID device. As a result, the RFID device can be useful when analyzing the temperature history at each check point during the process of moving a material.

As described above, an RFID device according to an embodiment of the present invention detects temperature from an RFID tag chip, outputs a voltage corresponding to the detected temperature, converts the voltage into a digital signal, and outputs the digital signal to a data bus without the requirement of an addition thermometer, thereby reducing the layout area of an RFID device, since an additional temperature sensor is not necessary.

The RFID device stores temperature data detected from an RFID tag chip in a temperature memory assigned to a specific region of a cell region to facilitate usage of the temperature information.

The RFID device measures the temperature characteristic of an RFID tag chip in order to compensate for the characteristic and stores the information in a nonvolatile register, thereby stabilizing the output voltage of the device by compensating for the temperature change.

Although a number of illustrative embodiments consistent with the invention have been described, it should be understood that numerous modifications and embodiments can be devised by those skilled in the art that will fall within the spirit and scope of this disclosure. More particularly, a number of variations and modifications are possible in the component parts and/or arrangements that are within the scope of the disclosure, the drawings, and the appended claims. In addition to variations and modifications in the component parts and/or arrangements, alternative uses will also be apparent to those skilled in the art.

What is claimed is:

1. An RFID device comprising:
   an analog block configured to receive a radio frequency signal and to detect an operating command signal from the radio frequency signal in order to output the operating command signal;
   a digital block configured to receive and analyze the operating command signal and to output an operating control signal, a temperature sensor activating signal, and a temperature compensating signal;
   a memory block configured to receive the operating control signal, the temperature sensor activating signal, and the temperature compensating signal, the memory block comprising:
      a temperature treating unit configured to set a parameter value for temperature compensation in response to the temperature compensating signal, configured to detect a temperature change state in response to the temperature sensor activating signal and comparing the temperature change state to the parameter value, wherein the temperature treating unit changes the parameter value according to the result of the comparison and outputs a digital code value corresponding to the temperature change state, and
   wherein the temperature treating unit comprises:
      a temperature sensing unit configured to detect the temperature change state in the RFID device in response to the temperature sensor activating signal in order to output a reference voltage and a temperature detecting voltage;
      a temperature compensating unit configured to set the parameter value for temperature compensation in response to the temperature compensating signal, wherein the temperature compensating unit compares the parameter value to the reference voltage in order to output a compensating voltage; and
      an analog to digital converting unit configured to convert the compensating voltage and the temperature detecting voltage in response to the temperature sensor activating signal in order to output the digital code value to a data bus.

2. The RFID device according to claim 1, wherein the memory block further comprising a temperature memory configured to store temperature data detected from the temperature treating unit.

3. The RFID device according to claim 2, wherein the digital block outputs an address including a temperature address according to the operating command signal, and the memory block further comprises:
   a peripheral circuit unit configured to receive the address and the operating control signal so as to generate an internal control signal;
   a cell array configured to read/write data into a plurality of nonvolatile ferroelectric capacitors,
      wherein the cell array is configured to read/write data in the plurality of nonvolatile ferroelectric capacitors in response to the internal control signal, and
      wherein a predetermined portion of the cell array is allocated for the temperature memory, and the temperature memory is assigned by the temperature address; and
   a sense amplifier unit and an input/output unit configured to sense and amplify data stored in the cell array and to output input data received from a data bus in the cell array.

4. The RFID device according to claim 1, wherein the temperature treating unit is disposed in a given region of the memory block and is controlled by a peripheral circuit unit.

5. The RFID device according to claim 1, wherein the voltage level of the temperature detecting voltage increases as temperature increases.

6. The RFID device according to claim 1, wherein the temperature sensing unit comprises:
a temperature detecting voltage generating unit configured to generate the temperature detecting voltage such that the temperature detecting voltage is proportional to temperature; and
a reference voltage generating unit configured to generate the reference voltage such that the value of the reference voltage is not dependent upon temperature.

7. The RFID device according to claim 1, wherein the analog to digital converting unit comprises:
a temperature code generating unit configured to compare the temperature detecting voltage to the compensating voltage in order to generate a plurality of thermometer code signals; and
a thermometer code treating unit configured to decode the thermometer code signals in response to the temperature sensor activating signal in order to output the digital code value to the data bus.

8. The RFID device according to claim 7, wherein the thermometer code generating unit comprises:
a plurality of resistors configured to divide the compensating voltage into a plurality of voltage values; and
a plurality of comparators each of which is configured to compare the temperature detecting voltage to a respective one of the voltage values in order to generate a respective one of the plurality of thermometer code signals.

9. The RFID device according to claim 8, wherein the thermometer code treating unit comprises a decoding unit configured to decode the thermometer code signals in order to output the digital code value to the data bus.

10. The RFID device according to claim 9, wherein first through seventh thermometer code signals are generated by the plurality of comparators, and the decoding unit comprises:
a first selecting unit receiving the second and third thermometer code signals and outputting one of the second and third thermometer code signals in response to the first thermometer code signal;
a second selecting unit receiving the fourth and fifth thermometer code signals and outputting one of the fourth and fifth thermometer code signals in response to the first code signal;
a third selecting unit receiving the sixth and seventh thermometer code signals and outputting one of the sixth and seventh thermometer code signals in response to the first thermometer code signal; and
a fourth selecting unit configured to select one of the output signals of the first selecting unit and the third selecting unit in response to the output signal of the second selecting unit.

11. The RFID device according to claim 10, wherein the temperature sensor activating signal must be activated in order for the first code signal to be activated.

12. The RFID device according to claim 1, wherein the temperature compensating unit comprises:
a temperature compensating treating unit configured to output a set signal for setting the parameter value in response to the temperature compensating signal;
a plurality of nonvolatile code units each of which is configured to store data in response to the set signal and to latch measuring data in response to a measuring enable signal and a latch enable signal;
a plurality of switching elements each of which is selectively turned on in response to a respective one of the output signals of a nonvolatile code unit in order to output the compensating voltage; and
a plurality of resistors each of which is connected between a reference voltage terminal which receives the reference voltage and a respective one of the switching elements.

13. The RFID device according to claim 12, wherein the temperature compensating unit adjusts the voltage level of the compensating voltage according to the number of the switching elements that are turned on.

14. The RFID device according to claim 12, wherein the nonvolatile code unit comprises:
a data storing unit configured to store the data in a nonvolatile ferroelectric capacitor in response to the set signal and to output the measuring data in response to the measuring enable signal; and
a latch unit configured to latch and output the measuring data in response to the latch enable signal.

15. The RFID device according to claim 14, wherein the data storing unit comprises:
a pull-up unit configured to pull-up an output terminal of a pull-up enable signal;
a pull-up latch unit configured to latch data of the output terminal;
an input/output unit configured to control the input/output of the data of the output terminal in response to the temperature compensating signal;
a nonvolatile storing capacitor unit configured to store the input data in response to a cell plate signal;
a pull-down unit configured to pull-down the output terminal in response to a pull-down enable signal; and
a pull-down latch unit configured to latch data of the output terminal.

16. The RFID device according to claim 1, wherein the temperature treating unit inactivates the temperature compensating signal and the temperature sensor activating signal when a difference between the parameter value and a sensed temperature is within a predetermined temperature value range, and changes the parameter value when the difference is not within the predetermined temperature value range.

17. A RFID device comprising:
a memory block configured to read/write data in a cell array including a plurality of nonvolatile ferroelectric capacitors; and
a temperature treating unit configured to set a parameter value for temperature compensation in response to a temperature compensating signal, configured to detect a temperature change state in response to a temperature sensor activating signal and comparing the temperature change state to the parameter value,
wherein the temperature treating unit changes the parameter value according to the result of the comparison and outputs a digital code value corresponding to the temperature change state,
wherein the temperature treating unit comprises:
a temperature sensing unit configured to detect the temperature change state in the RFID device in response to the temperature sensor activating signal in order to output a reference voltage and a temperature detecting voltage;

a temperature compensating unit configured to set the parameter value for temperature compensation in response to the temperature compensating signal, wherein the temperature compensating unit compares the reference voltage to the parameter value in order to output a compensating voltage; and an analog to digital converting unit configured to convert the compensating voltage and the temperature detecting voltage in response to the temperature sensor activating signal in order to output the digital code value to a data bus.

18. The RFID device according to claim 17, wherein the analog to digital converting unit comprises:

a thermometer code generating unit configured to compare the temperature detecting voltage to the compensating voltage in order to generate a plurality of thermometer code signals; and a thermometer code treating unit configured to decode the thermometer code signals in response to the temperature sensor activating signal in order to output the digital code value to the data bus.

19. The RFID device according to claim 18, wherein the thermometer code generating unit comprises:

a plurality of resistors configured to divide the compensating voltage into a plurality of voltage values; and a plurality of comparators each of which is configured to compare the temperature detecting voltage to a respective one of the voltage values in order to generate a respective one of the thermometer code signals.

20. The RFID device according to claim 18, wherein the thermometer code treating unit comprises a decoding unit configured to decode the thermometer code signals in order to output the digital code value to the data bus.

21. The RFID device according to claim 17, wherein the temperature compensating unit comprises:

a temperature compensating treating unit configured to output a set signal for setting the parameter value in response to the temperature compensating signal;

a plurality of nonvolatile code units each of which is configured to store data in response to the set signal and to latch measuring data in response to a measuring enable signal and a latch enable signal;

a plurality of switching elements each of which is selectively turned on in response to a respective one of the output signals of a nonvolatile code unit in order to output the compensating voltage; and a plurality of resistors each of which is connected between a reference voltage receiving unit and a respective one of the switching elements.

22. The RFID device according to claim 21, wherein the nonvolatile code unit comprises:

a data storing unit configured to store the data in a nonvolatile ferroelectric capacitor in response to the set signal and output the measuring data in response to the measuring enable signal; and a latch unit configured to latch and output the measuring data in response to the latch enable signal.

23. The RFID device according to claim 22, wherein the data storing unit comprises:

a pull-up unit configured to pull up an output terminal in response to a pull-up enable signal;

a pull-up latch unit configured to latch data of the output terminal;

an input/output unit configured to control the input/output of the data of the output terminal in response to the temperature compensating signal;

a nonvolatile storage capacitor unit configured to store the input data in response to a cell plate signal;

a pull-down unit configured to pull-down the output terminal in response to a pull-down enable signal; and a pull-down latch unit configured to latch data of the output terminal.

* * * * *